United States Patent
Inomata

(10) Patent No.: US 9,905,013 B2
(45) Date of Patent: Feb. 27, 2018

(54) SPEED CALCULATING DEVICE AND SPEED CALCULATING METHOD, AND COLLISION DETERMINATION DEVICE

(75) Inventor: Ryo Inomata, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/425,063

(22) PCT Filed: Sep. 3, 2012

(86) PCT No.: PCT/JP2012/072362
§ 371 (c)(1),
(2), (4) Date: Mar. 2, 2015

(87) PCT Pub. No.: WO2014/033955
PCT Pub. Date: Mar. 6, 2014

(65) Prior Publication Data
US 2015/0262375 A1    Sep. 17, 2015

(51) Int. Cl.
*G06T 7/20*         (2017.01)
*G06K 9/00*         (2006.01)
(Continued)

(52) U.S. Cl.
CPC ............... *G06T 7/20* (2013.01); *G01S 13/04* (2013.01); *G01S 13/867* (2013.01);
(Continued)

(58) Field of Classification Search
CPC ..... G01S 2013/9325; G01S 2013/9321; G01S 2013/9375; G01S 13/867; G01S 13/04;
(Continued)

(56) References Cited

U.S. PATENT DOCUMENTS 6,311,121 B1 * 10/2001 Kuragaki ........... B60K 31/0008
                                                180/167
6,311,122 B1 * 10/2001 Higashimata ...... B60K 31/0008
                                                180/179
(Continued)

FOREIGN PATENT DOCUMENTS

JP      2009-186260 A    8/2009
JP      2010-146494 A    7/2010

OTHER PUBLICATIONS

International Search Report for PCT/JP2012/072362 dated Oct. 16, 2012.

*Primary Examiner* — Kenny Cese
(74) *Attorney, Agent, or Firm* — Sughrue Mion, PLLC

(57) ABSTRACT

A speed calculating device calculates the speed of an object around a moving body and includes: an image detection unit that captures an image of the surroundings of the moving body and detects the object from the captured image; and a speed calculation unit that calculates the speed of the object, using a moving body speed indicating the speed of the moving body and an image speed, which indicates the speed of the object and is calculated from the image, at a ratio corresponding to a distance from the moving body to the object. The speed calculation unit calculates the speed of the object using the moving body speed and the image speed such that the ratio of the moving body speed increases as the distance to the object increases and the ratio of the image speed increases as the distance to the object decreases.

12 Claims, 7 Drawing Sheets

(51) Int. Cl.
*G01S 13/04* (2006.01)
*G01S 17/93* (2006.01)
*G01S 13/86* (2006.01)
*G08G 1/16* (2006.01)

(52) U.S. Cl.
CPC ......... *G06K 9/00805* (2013.01); *G08G 1/166* (2013.01); *G01S 17/936* (2013.01)

(58) Field of Classification Search
CPC ..... G01S 17/936; B60W 30/16; B60W 30/09; B60W 2750/308; B60W 2550/308; B60W 2420/52; G06T 2207/30252; G06T 7/20; G06K 9/00805; G08G 1/166
See application file for complete search history.

(56) References Cited

U.S. PATENT DOCUMENTS

| | | | |
|---|---|---|---|
| 2004/0061626 A1* | 4/2004 | Kubota | B60K 31/0008 701/96 |
| 2004/0090319 A1* | 5/2004 | Kimura | B60T 7/22 340/435 |
| 2009/0143951 A1* | 6/2009 | Takahashi | B60W 30/02 701/70 |
| 2010/0156616 A1 | 6/2010 | Aimura et al. | |
| 2013/0110368 A1* | 5/2013 | Zagorski | B60T 7/22 701/70 |

\* cited by examiner

SPEED CALCULATING DEVICE AND SPEED CALCULATING METHOD, AND COLLISION DETERMINATION DEVICE

CROSS REFERENCE TO RELATED APPLICATIONS

This application is a National Stage of International Application No. PCT/JP2012/072362 filed Sep. 3, 2012, the contents of all of which are incorporated herein by reference in their entirety.

TECHNICAL FIELD

The present invention relates to a speed calculating device, a speed calculating method, and a collision determination device which calculate the speed of an object around a moving body.

BACKGROUND ART

A technique has been known which calculates a distance to an object around a moving body and the speed of the object on the basis of image information in order to control the moving body. For example, Japanese Unexamined Patent Application Publication No. 2010-146494 discloses a device which switches a detection algorithm for short distance and a detection algorithm for long distance to detect an object in front of a vehicle, on the basis of whether the distance to the object is less than a threshold value.

CITATION LIST

Patent Literature

[Patent Literature 1] Japanese Unexamined Patent Application Publication No. 2010-146494

SUMMARY OF INVENTION

Technical Problem

However, the device calculates the speed of the object, using different algorithms in a situation in which the distance to the object is slightly less than the threshold value and a situation in which the distance to the object is slightly greater than the threshold value. Therefore, when there is a large difference in the calculation result of the speed of the object, the moving body is not smoothly controlled and the operator of the moving body feels discomfort.

An object of the invention is to provide a speed calculating device, a speed calculating method, and a collision determination device which can accurately calculate the speed of an object around a moving body such that the operator of a moving body does not feel discomfort.

Solution to Problem

According to an aspect of the invention, there is provided a speed calculating device that calculates a speed of an object around a moving body. The speed calculating device includes: an image detection unit that captures an image of the surroundings of the moving body and detects the object from the captured image; and a speed calculation unit that calculates the speed of the object, using a moving body speed indicating the speed of the moving body and an image speed, which indicates the speed of the object and is calculated from the image, at a ratio corresponding to a distance from the moving body to the object. The speed calculation unit calculates the speed of the object using the moving body speed and the image speed such that the ratio of the moving body speed increases as the distance to the object increases and the ratio of the image speed increases as the distance to the object decreases.

According to this structure, the speed of the object is calculated using the moving body speed and the image speed at a ratio corresponding to the distance to the object. Therefore, it is possible to accurately calculate the speed of a distant object and the speed of a near object according to a change in the distance to the object. As the distance to the object increases, the accuracy of the image speed is reduced. Therefore, in particular, the ratio of the moving body speed increases in order to calculate the speed of the distant object and the ratio of the image speed increases in order to calculate the speed of the near object. As a result, it is possible to accurately calculate the speed of the object.

The speed calculating device may further include a radar detection unit that detects the object using a radar wave. When the object is not detected by the radar detection unit, but is detected by the image detection unit, the speed calculation unit may calculate the speed of the object, using the moving body speed and the image speed. According to this structure, the detection result obtained by the radar wave and the detection result obtained by the image can be appropriately used according to the detection situation of the object to calculate the speed of the object.

The speed calculating device may further include a composite target generation unit that generates a composite target of the object using a detection result obtained by the radar detection unit and a detection result obtained by the image detection unit. When the radar detection unit does not detect the object after the composite target is generated, the speed calculation unit may calculate the speed of the object, using the moving body speed and the image speed. According to this structure, the composite target and the detection result obtained by the image can be appropriately used according to the detection situation of the radar detection unit to calculate the speed of the object.

The speed calculating device may further include a radar detection unit that detects the object using a radar wave. When the object is present outside a detection range of the radar detection unit and is present in a detection range of the image detection unit, the speed calculation unit may calculate the speed of the object, using the moving body speed and the image speed. According to this structure, the detection result obtained by the radar wave and the detection result obtained by the image can be appropriately used according to the position of the object to calculate the speed of the object.

The speed calculating device may further include a stationary state determination unit that determines whether the object is stationary in a traveling direction of the moving body. When it is determined that the object is stationary, the speed calculation unit may calculate the speed of the object using the moving body speed and the image speed. According to this structure, it is possible to accurately calculate the speed of the object using the moving body speed.

When the distance to the object is equal to or greater than an upper limit, the speed calculation unit may calculate the speed of the object using the moving body speed and the image speed such that the ratio of the moving body speed is 1 and the ratio of the image speed is 0. According to this structure, it is possible to accurately calculate the speed of a distant object using only the moving body speed.

When the distance to the object is equal to or less than a lower limit, the speed calculation unit may calculate the speed of the object using the moving body speed and the image speed such that the ratio of the moving body speed is 0 and the ratio of the image speed is 1. According to this structure, it is possible to accurately calculate the speed of a near object using only the image speed.

According to another aspect of the invention, there is provided a collision determination device including: the above-mentioned speed calculating device; and a collision determination unit that determines a collision with the object on the basis of the speed of the object calculated by the speed calculating device. According to this structure, it is possible to determine a collision with the object on the basis of the speeds of a near object and a distant object which are accurately calculated according to a change in the distance to the object.

The speed calculating device may capture the image of the front side of the moving body, detect the object from the captured image, and calculate the speed of the object in front of the moving body.

The speed calculating device may capture an image in the traveling direction of the moving body, detect the object from the captured image, and calculate the speed of the object in the traveling direction of the moving body.

The moving body may be a vehicle or other moving bodies, such as a ship, an airplane, and a flying object.

According to still another aspect of the invention, there is provided a speed calculating method that calculates a speed of an object around a moving body. The speed calculating method includes: capturing an image of the surroundings of the moving body and detecting the object from the captured image; and calculating the speed of the object, using a moving body speed indicating the speed of the moving body and an image speed, which indicates the speed of the object and is calculated from the image, such that the ratio of the moving body speed increases as the distance to the object increases and the ratio of the image speed increases as the distance to the object decreases. According to this structure, it is possible to accurately calculate the speeds of the near and distant objects according to a change in the distance to the object.

Advantageous Effects of Invention

According to the invention, it is possible to provide a speed calculating device, a speed calculating method, and a collision determination device which can accurately calculate the speed of an object around a vehicle such that the operator of a moving body does not feel discomfort.

DESCRIPTION OF EMBODIMENTS

Figure 1:
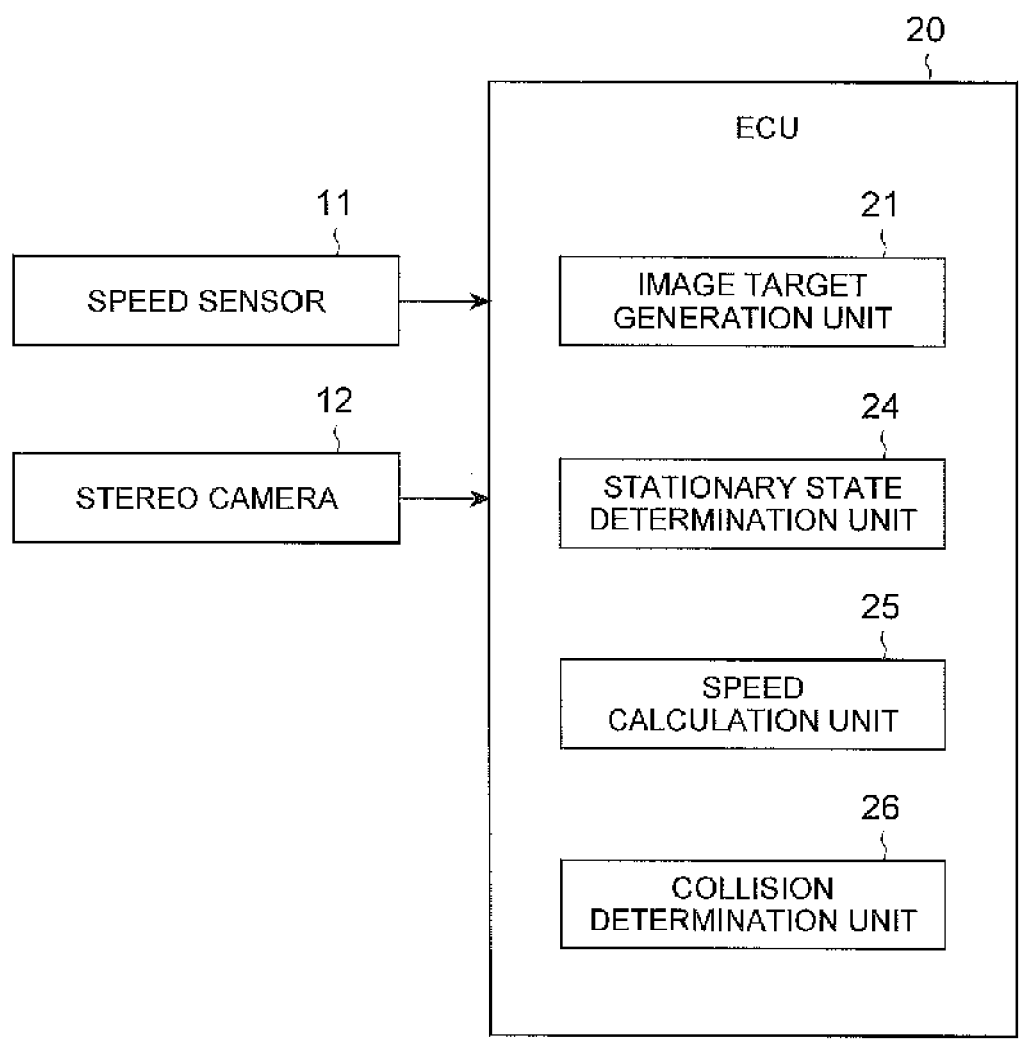
FIG. 1 is a block diagram illustrating the structure of a collision determination device according to a first embodiment of the invention.

Hereinafter, embodiments of the invention will be described in detail with reference to the accompanying drawings. In the description of the drawings, the same components are denoted by the same reference numerals and the description thereof will not be repeated.

A speed calculating device, a speed calculating method, and a collision determination device according to embodiments of the invention will be described below. The speed calculating device and the speed calculating method calculate the speed of an object around a moving body. The collision determination device determines a collision with the object on the basis of the speed of the object calculated by the speed calculating device.

Hereinafter, an embodiment will be described in which the moving body is a vehicle and the collision determination device determines a collision with an object on the basis of the speed of the object calculated by the speed calculating device that calculates the speed of the object around the vehicle, particularly, in front of the vehicle. However, the moving body is not limited to the vehicle and may be, for example, a ship, an airplane, or a flying object. In addition, the position where the speed of the object is calculated by the speed calculating device is not limited to the front side of the moving body and the speed calculating device may calculate the speed of the object in the traveling direction of the moving body. The collision determination device may determine a collision with the object on the basis of the speed of the object.

The collision determination device according to a first embodiment of the invention will be described with reference to FIGS. 1 to 4.

The collision determination device is provided in the vehicle and determines a collision between the vehicle and the object using an image sensor. The collision determination device also functions as a speed calculating device which calculates the speed of the object using the image sensor. The object includes a moving body and a stationary body and is an obstacle which prevents the traveling of the vehicle, such as, a vehicle in front, an oncoming vehicle, a bicycle, a pedestrian, a parked vehicle, or a guardrail.

First, the structure of the collision determination device will be described with reference to FIG. 1. FIG. 1 is a block diagram illustrating the structure of the collision determination device according to the first embodiment. As shown in FIG. 1, the collision determination device includes a speed sensor 11, a stereo camera 12, and an electronic control unit (ECU) 20.

The speed sensor 11 detects the speed of the vehicle. For example, a wheel speed sensor is used as the speed sensor 11. The speed sensor 11 supplies the detected vehicle speed (absolute speed) to the ECU 20.

The stereo camera 12 functions as an image detection unit (image sensor) which captures the image of the front side of the vehicle and detects the object on the basis of the captured image. For example, a charge-coupled device (CCD) or a complementary metal-oxide semiconductor (CMOS) sensor is used as the stereo camera 12. The stereo camera 12 includes a plurality of cameras and is provided on the front surface of the vehicle or in the cabin of the vehicle. The stereo camera 12 supplies image detection information indicating the detection result of the object to the ECU 20. In addition, a single camera may be used instead of the stereo camera 12.

The ECU 20 includes an image target generation unit 21, a stationary state determination unit 24, a speed calculation unit 25, and a collision determination unit 26. The ECU 20 includes, for example, a CPU, a ROM, and a RAM as main components. The CPU executes a program to implement the functions of the image target generation unit 21, the stationary state determination unit 24, the speed calculation unit 25, and the collision determination unit 26. The ECU 20 may be a single unit or it may include a plurality of units.

The image target generation unit 21 generates an image target on the basis of the image detection information from the stereo camera 12. The image target has target information related to the distance to the object and the lateral position of the object which are calculated from the coordinates of the vehicle as a reference point.

The target information of the image target is calculated by the principle of triangulation, on the basis of the deviation between the image detection information items of the left and right cameras forming the stereo camera 12, or it is calculated on the basis of the detection size and position of, for example, a number plate of the vehicle in front. The distance to the object indicates the distance from the vehicle (stereo camera 12) to the object in the traveling direction of the vehicle. The lateral position of the object indicates the distance from the vehicle (stereo camera 12) to the object in a direction perpendicular to the traveling direction of the vehicle. The lateral position of the image target also includes the range of the object detected from the image in the lateral direction, that is, information about the width of the object. When the target information is calculated, for example, a process of averaging the calculated values may be performed in order to reduce a calculation error.

The image target generation unit 21 calculates an image speed (absolute speed) from the image detection information indicating the speed of the object. The image speed is calculated on the basis of the distance to the object and the vehicle speed, using the target information of the image target. The image speed is calculated on the basis of, for example, a change in the distance to the object in consecutive cycles. For example, the image speed is calculated by dividing the difference between the distance in a processing cycle i and the distance in a processing cycle i+1 by the interval of the processing cycle and reducing the vehicle speed from the divided value. When the image speed is calculated, for example, a process of averaging the calculated values in the consecutive processing cycles may be performed in order to reduce a calculation error.

The stationary state determination unit 24 determines whether the object in front of the vehicle is stationary on the basis of the image speed. The stationary state of the object means that the speed (absolute speed) of the object in the traveling direction of the vehicle is 0 or substantially 0. For example, a pedestrian who crosses in front of the vehicle is assumed as the object.

The speed calculation unit 25 calculates the speed (relative speed) of the object on the basis of the vehicle speed and the target information of the image target. The speed calculation unit 25 calculates the speed of the object, using the vehicle speed indicating the speed of the vehicle and the image speed indicating the speed of the object at a ratio corresponding to the distance to the object. The speed calculation unit 25 sets the ratio corresponding to the distance to the object such that the ratio of the vehicle speed increases as the distance to the object increases and the ratio of the image speed increases as the distance to the object decreases. In addition, the speed calculation unit 25 may calculate the speed of the object using the vehicle speed and the image speed only when the object in front of the vehicle is stationary.

The collision determination unit 26 determines a collision with the object on the basis of the speed of the object calculated by the speed calculation unit 25. The collision determination unit 26 determines the possibility of a collision with the object on the basis of whether a collision time obtained by dividing the distance to the object by the speed of the object is less than a predetermined threshold value. For example, the determination result of the collision possibility is used to notify the driver of information or to control the braking or steering of the vehicle to support collision avoidance.

Figure 2:
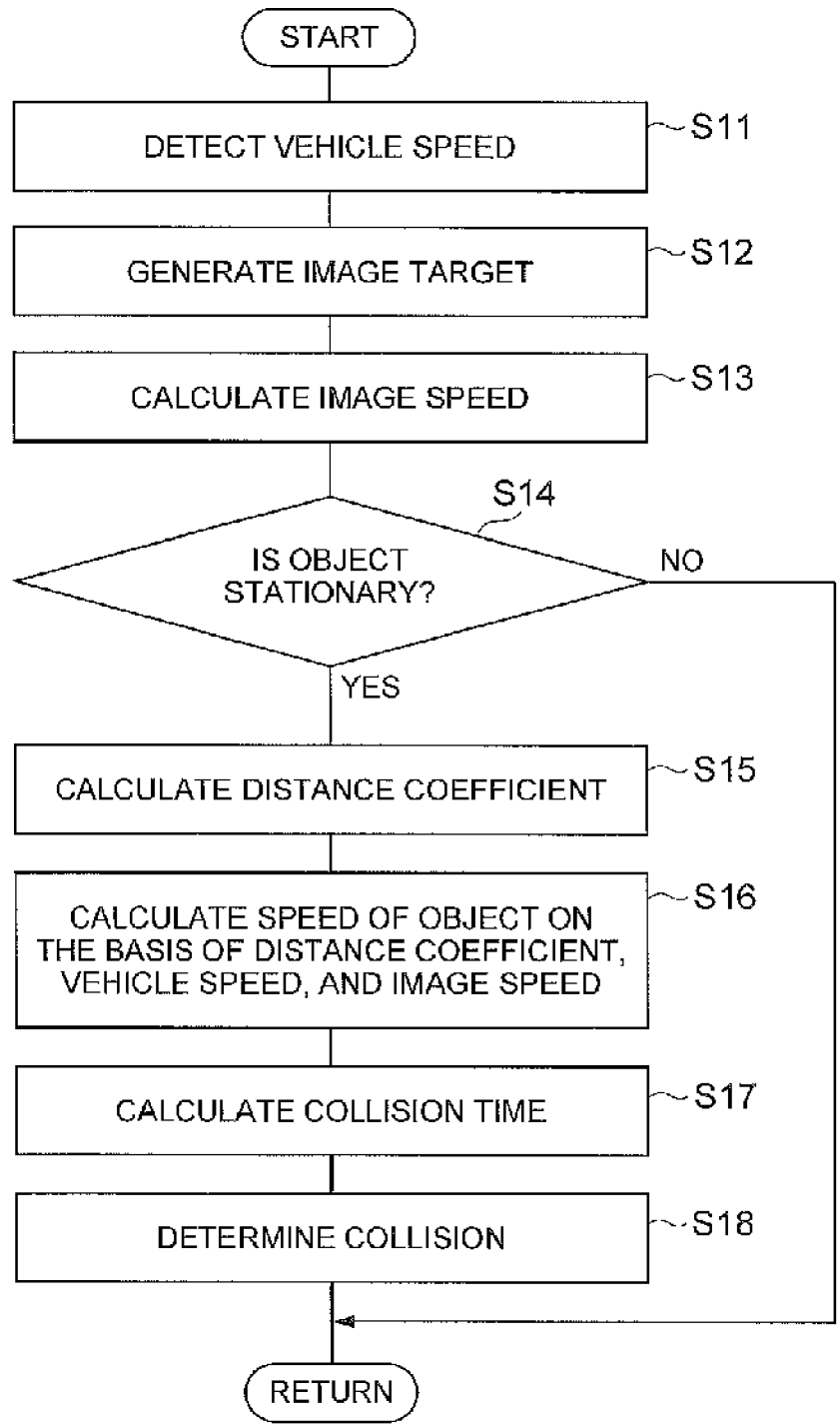
FIG. 2 is a flowchart illustrating the operation of the collision determination device.

Next, the operation of the collision determination device will be described with reference to FIGS. 2 and 3. FIG. 2 is a flowchart illustrating the operation of the collision determination device. The collision determination device repeatedly performs the process shown in FIG. 2 in a predetermined cycle.

The speed sensor 11 detects the vehicle speed (absolute speed) (Step S11). When there is an object in the detection range of the stereo camera 12, the image target generation unit 21 generates an image target (S12). The image target generation unit 21 calculates the image speed (absolute speed) from the image detection information indicating the speed of the object (S13).

The stationary state determination unit 24 determines whether the object in front of the vehicle is stationary on the basis of the image speed (S14). This is because the accuracy of calculating the speed of the object on the basis of the vehicle speed can increase as the speed of the object in the traveling direction of the vehicle is reduced. However, the process in S14 may be omitted.

When the process in S14 is performed, the process in S15 and the subsequent steps is performed if it is determined in S14 that the object is stationary. If it is determined in S14 that the object is not stationary, the process is not performed and ends. In addition, it may be determined whether the object is a pedestrian who crosses a road on the basis of image recognition or it may be determined whether the object is present at the position of a crosswalk on the basis of image recognition or map information, instead of determining whether the object is stationary.

The speed calculation unit 25 calculates a distance coefficient corresponding to the distance to the object, using the target information of the image target (S15). The distance coefficient is a coefficient indicating the ratio (weighting) of the vehicle speed and the image speed used to calculate the speed of the object and is calculated using, for example, a distance coefficient map which will be described below.

Figure 3:
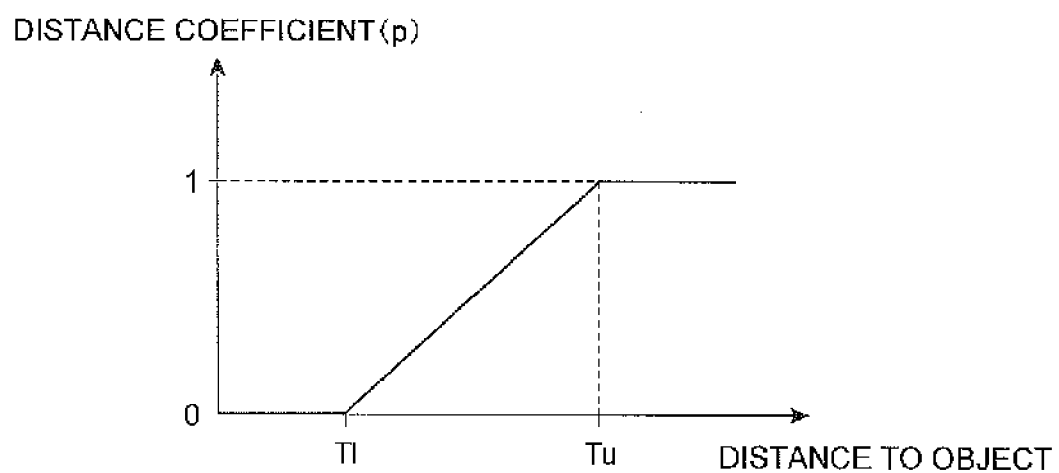
FIG. 3 is a diagram illustrating an example of a distance coefficient map.

FIG. 3 is a diagram illustrating an example of the distance coefficient map. As shown in FIG. 3, the distance coefficient map indicates the relationship between the distance to the object on the horizontal axis and the distance coefficient on the vertical axis. The lower limit Tl and upper limit Tu of the distance are set on the distance coefficient map. For example, the distance coefficient indicates the ratio (0 to 1) of the vehicle speed when the sum of the ratio of the vehicle speed and the ratio of the image speed is 1. In this example, the distance coefficient is set to "0" when the distance to the object is equal to or less than the lower limit T1, is set to "1" when the distance is equal to or greater than the upper limit Tu, and is set to a value between "0" and "1" when the distance is between the lower limit T1 and the upper limit Tu. In the example shown in FIG. 3, the distance coefficient is set so as to monotonically increase between the lower limit T1 and the upper limit Tu. However, the distance coefficient may be set so as to increase in different manners.

Returning to FIG. 2, when the distance coefficient is calculated in S15, the speed calculation unit 25 calculates the speed (relative speed) V of the object on the basis of the distance coefficient (p), the vehicle speed (V1), and the image speed (V2) (S16). The speed V of the object is calculated by the following expression:

$$V=p\cdot(-V1)+(1-p)\cdot(V2-V1). \quad [\text{Expression (1)}]$$

That is, the speed of the object is calculated using only the image speed when the distance to the object is equal to or less than the lower limit T1 and is calculated using only the vehicle speed when the distance is equal to or greater than the upper limit Tu. When the distance to the object is between the lower limit T1 and the upper limit Tu, the speed of the object is calculated using (with a larger weight) a higher ratio of the vehicle speed as the distance to the object increases and is calculated using (with a larger weight) a higher ratio of the image speed as the distance to the object decreases.

When the speed of the object is calculated, the collision determination unit 26 divides the distance to the object by the speed of the object to calculate a collision time (S17). Then, the collision determination unit 26 determines a collision with the object on the basis of whether the collision time is less than a predetermined threshold value (S18).

Figure 4:
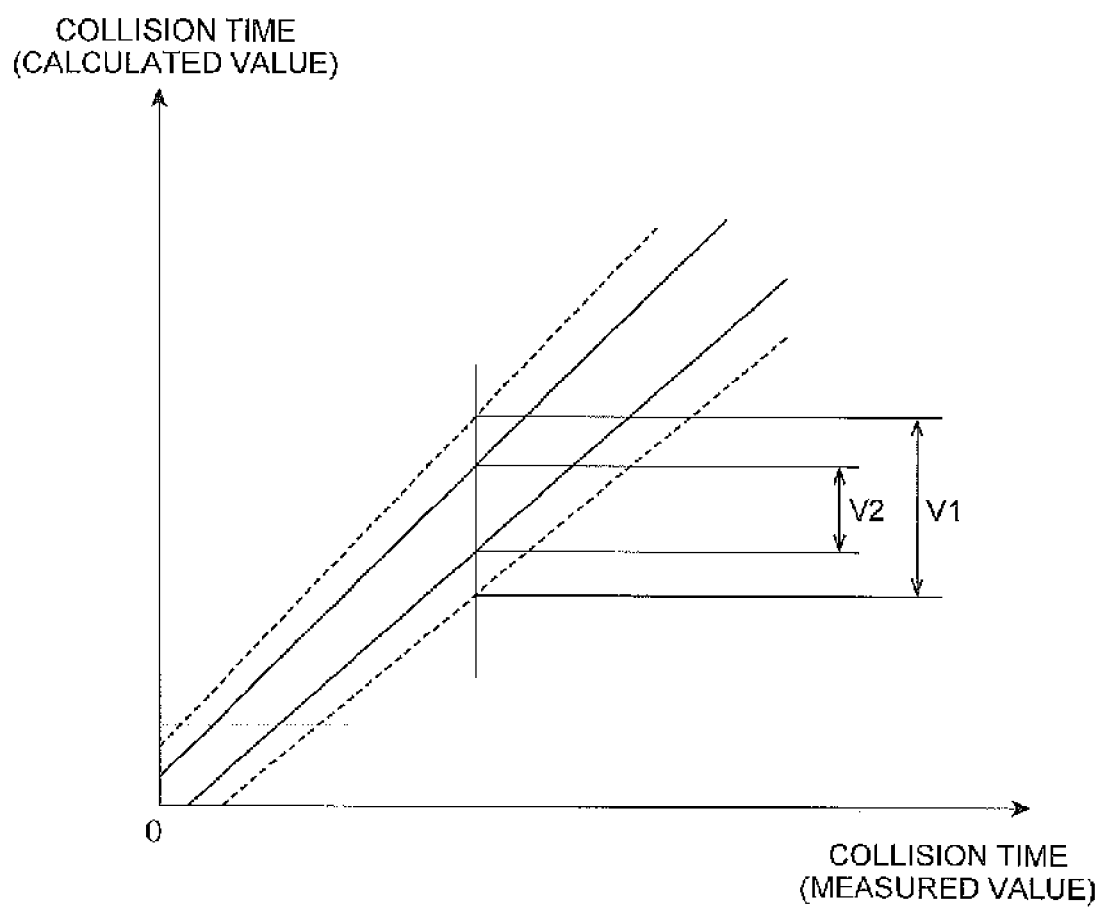
FIG. 4 is a diagram illustrating the comparison between the calculation result of a collision time based on an image speed and the calculation result of a collision time based on a vehicle speed and the image speed.

FIG. 4 is a diagram illustrating the comparison between the calculation result of the collision time based on the image speed and the calculation result of the collision time based on the vehicle speed and the image speed. The collision time based on the image speed is calculated by dividing the distance to the object by the speed of the object corresponding to the image speed and the collision time based on the vehicle speed and the image speed is calculated by dividing the distance to the object by the speed of the object calculated on the basis of the vehicle speed and the image speed. In FIG. 4, the horizontal axis indicates the actually measured collision time and the vertical axis indicates the calculation result of the collision time.

FIG. 4 shows a variation in the calculation result of the collision time due to a variation in the distance to the object. A dashed line indicates the range V1 of the variation in the calculation result based on the image speed and a solid line indicates the range V2 of the variation in the calculation result based on the vehicle speed and the image speed. As shown in FIG. 4, the variation in the calculation result (V2) based on the vehicle speed and the image speed is reduced to about half the variation in the calculation result (V1) based on the image speed. Therefore, when the collision time is accurately calculated, it is possible to accurately determine the collision with the object.

As described above, according to the speed calculating device of the first embodiment, the speed of the object is calculated using the vehicle speed (moving body speed) and the image speed at a ratio corresponding to the distance to the object. Therefore, it is possible to accurately calculate the speeds of a near object and a distant object according to a change in the distance to the object. As the distance to the object increases, the accuracy of the image speed is reduced. Therefore, in particular, the ratio of the vehicle speed (moving body speed) increases in order to calculate the speed of the distant object and the ratio of the image speed increases in order to calculate the speed of the near object. As a result, it is possible to accurately calculate the speed of the object.

When it is determined that the object is stationary, the speed of the object is calculated using the vehicle speed (moving body speed) and the image speed. Therefore, the speed of the object may be accurately calculated using the vehicle speed (moving body speed).

According to the collision determination device of the embodiment of the invention, it is possible to determine a collision with the object on the basis of the speeds of a near object and a distant object which are accurately calculated according to a change in the distance to the object.

According to the speed calculating method of the embodiment of the invention, the speed of the object is calculated using the vehicle speed (moving body speed) and the image speed at a ratio corresponding to the distance to the object. Therefore, it is possible to accurately calculate the speeds of a near object and a distant object according to a change in the distance to the object.

Figure 5:
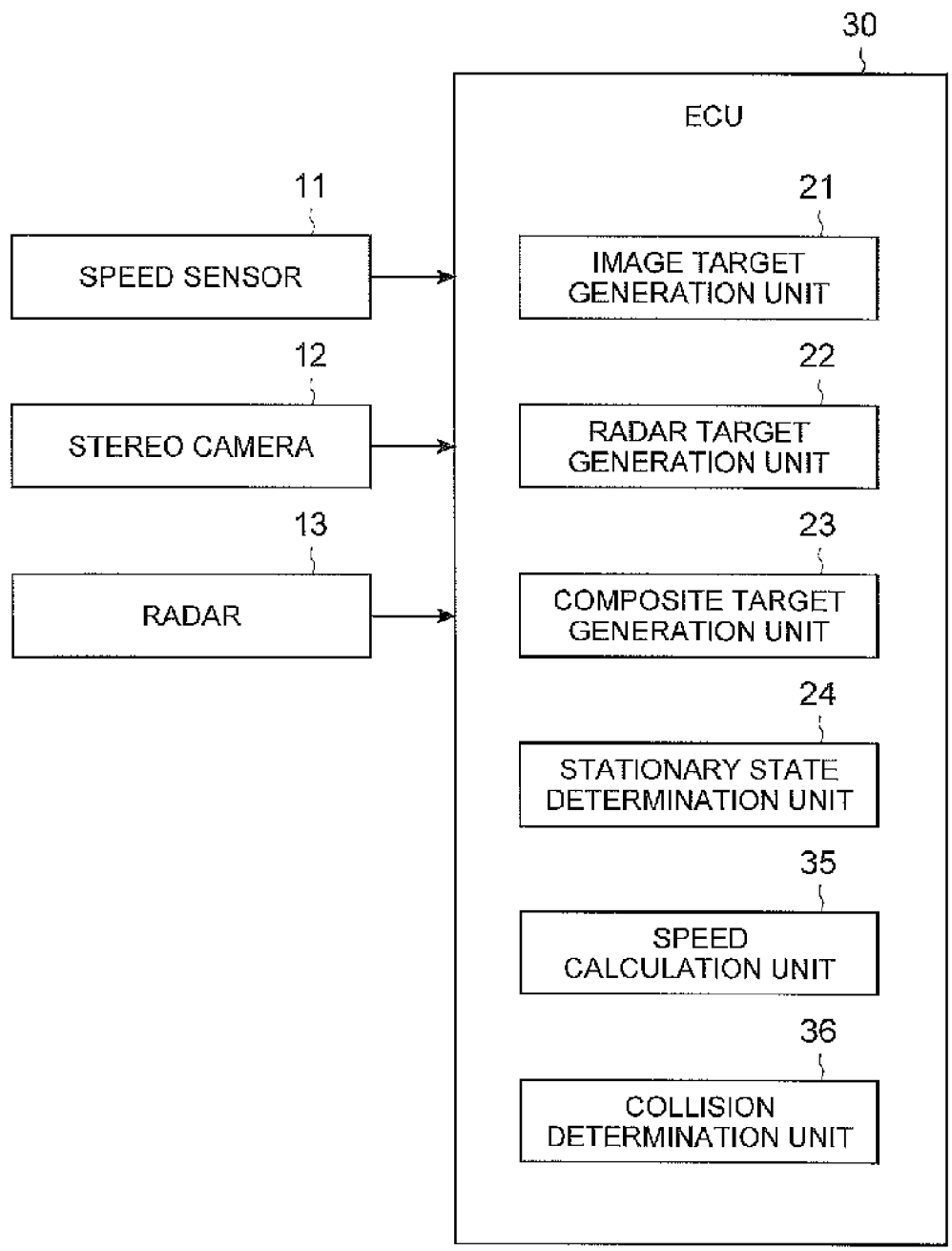
FIG. 5 is a block diagram illustrating the structure of a collision determination device according to a second embodiment of the invention.

Next, a collision determination device according to a second embodiment of the invention will be described with reference to FIGS. 5 to 7. In the second embodiment, the description of the same components as those in the first embodiment will not be repeated.

The collision determination device is provided in a vehicle and determines a collision between the vehicle and an object using a radar sensor and an image sensor. The collision determination device also functions as a speed calculating device which calculates the speed of the object using the radar sensor and the image sensor.

First, the structure of the collision determination device will be described with reference to FIGS. 5 and 6. FIG. 5 is a block diagram illustrating the structure of the collision determination device according to the second embodiment. As shown in FIG. 5, the collision determination device includes a speed sensor 11, a stereo camera 12, an ECU 30, and a radar 13. The structure and function of the speed sensor 11 and the stereo camera 12 are the same as those in the first embodiment and thus the description thereof will not be repeated.

The radar 13 functions as a radar detection unit (radar sensor) which detects an object in front of the vehicle using radar waves, transmits radar waves (electromagnetic waves) to the front side of the vehicle, and receives radar waves reflected from the object. For example, a microwave radar, a millimeter-wave radar, an ultrasonic radar, or a laser radar is used as the radar 13. The radar 13 supplies radar detection information indicating the detection result of the object to the ECU 30.

The ECU 30 includes an image target generation unit 21, a stationary state determination unit 24, a speed calculation unit 25, a collision determination unit 26, a radar target generation unit 22, and a composite target generation unit 23. The ECU 30 includes, for example, a CPU, a ROM, and a RAM as main components. The CPU executes a program to implement the functions of the image target generation unit 21, the radar target generation unit 22, the composite target generation unit 23, the stationary state determination unit 24, the speed calculation unit 35, and the collision determination unit 36. The structure and function of the image target generation unit 21 and the stationary state determination unit 24 are the same as those in the first embodiment and thus the description thereof will not be repeated.

The radar target generation unit 22 generates a radar target on the basis of the radar detection information from the radar 13. The radar target has target information related to the distance to the object and the lateral position of the object which are calculated from the coordinates of the vehicle as a reference.

The target information of the radar target is calculated on the basis of the radar detection information from the radar 13. The distance to the object indicates the distance from the vehicle (radar 13) to the object in the traveling direction of the vehicle and is calculated on the basis of the time from the transmission of the radar wave from the radar 13 to the reception of the radar wave reflected from the object. The lateral position of the object indicates the distance from the vehicle (radar 13) to the object in a direction perpendicular to the traveling direction of the vehicle and is calculated on the basis of the direction (angle) of the radar wave which is reflected from the objected and is then received. The lateral position of the radar target is information about the position of the object detected by the radar 13 and does not include information about the width of the object.

Figure 6:
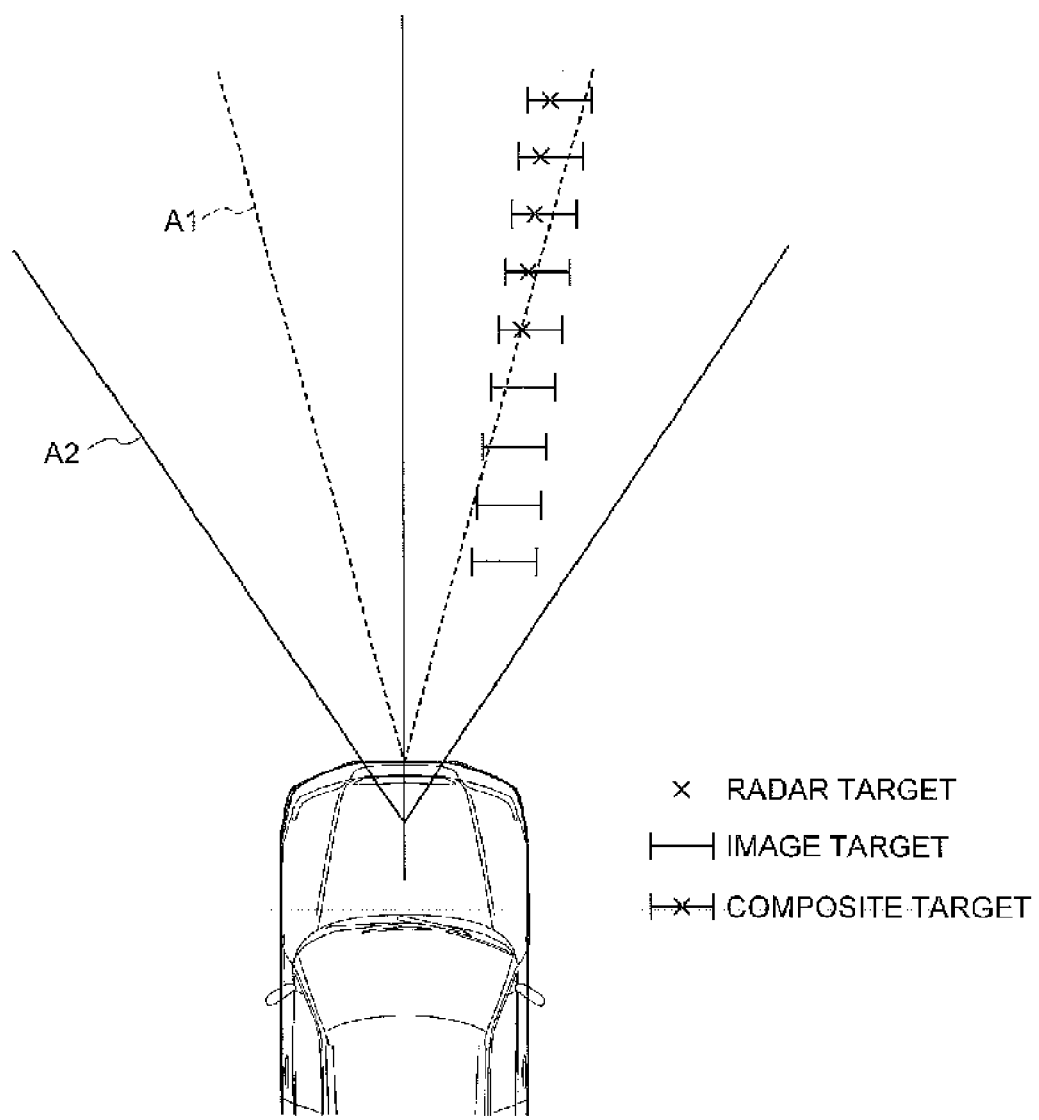
FIG. 6 is a diagram illustrating the detection ranges of a stereo camera and a radar.
Figure 7:
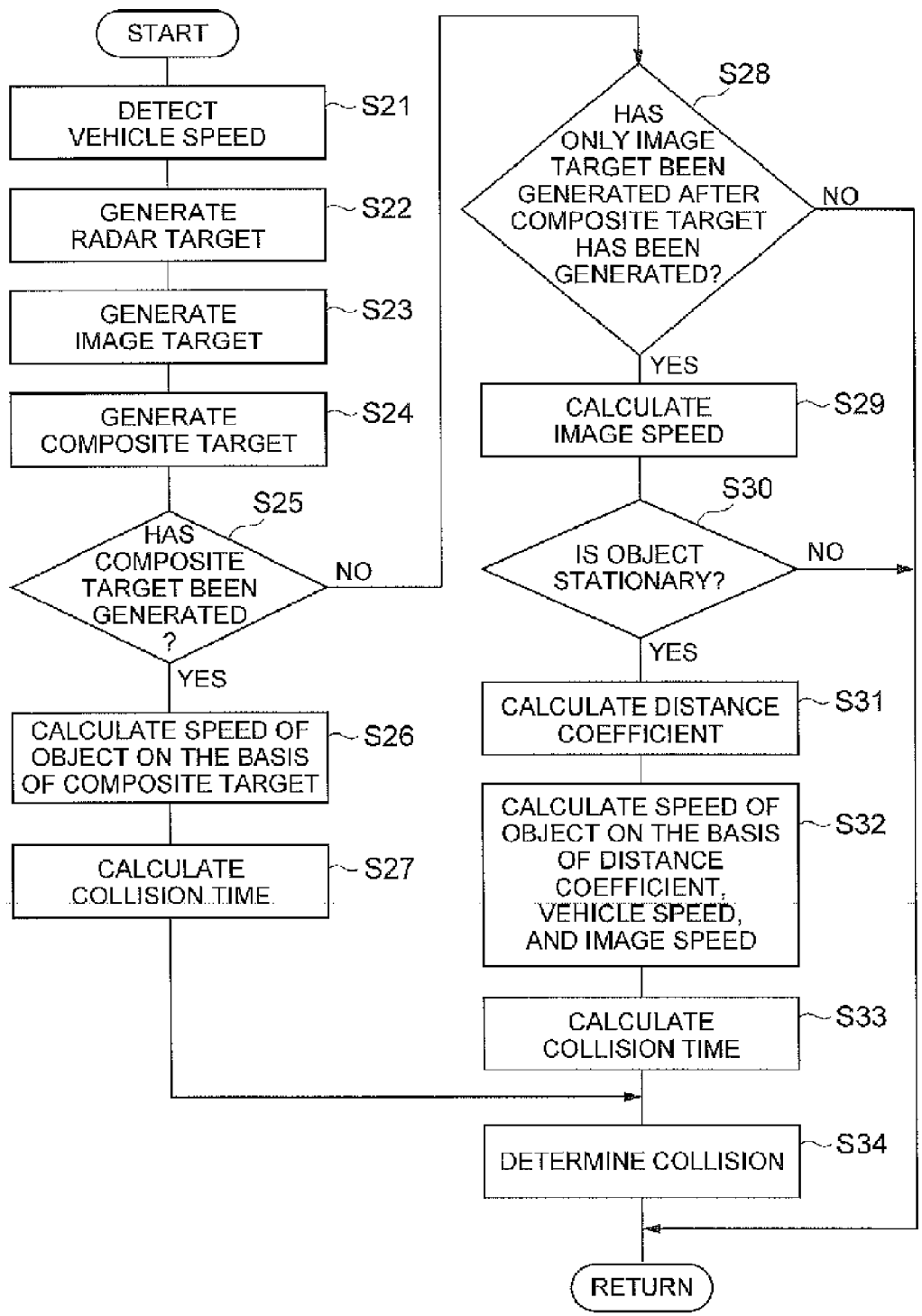
FIG. 7 is a flowchart illustrating the operation of the collision determination device.

FIG. 6 is a diagram illustrating the detection ranges A1 and A2 of the radar 13 and the stereo camera 12. As shown in FIG. 6, the detection range A1 of the radar 13 is narrower than the detection range A2 of the stereo camera 12. Therefore, a region which can be detected only by the stereo camera 12 and is arranged outside the detection range A1 of the radar 13 is present diagonally in front of the vehicle. FIG. 6 shows a target which moves from the detection ranges A1 and A2 of the radar 13 and the stereo camera 12 to the detection range A2 of the stereo camera 12.

The radar 13 has low accuracy in the detection of the lateral position considering the width of the object and is not capable of detecting the width of the object. However, the radar 13 has high accuracy in the detection of the distance to the object. In contrast, the stereo camera 12 has low accuracy in the detection of the distance to the object but has high accuracy in the detection of the lateral position and width of the object. Therefore, the detection accuracy of an image speed which is calculated on the basis of the distance to the object in the target information of an image target is reduced as the distance to the object increases.

The composite target generation unit 23 generates a composite target of the object, using the target information of the radar target and the image target, that is, the detection results of the radar 13 and the stereo camera 12. The composite target is generated by collating the two targets on the basis of the target information of the radar target and the image target. The two targets are collated with each other on the basis of the similarity between the target information items of the two targets, that is, the similarity between the distances to the object and the lateral positions. The composite target has target information related to the distance to the object and the lateral position (including the width) of the object. The target information of the composite target is based on the target information of the radar target and the image target and has higher accuracy than the target information of only the radar target or the target information of only the image target.

The speed calculation unit 35 calculates the speed (relative speed) of the object on the basis of a vehicle speed and the target information of the composite target, the radar target, or the image target. When the composite target is generated, the speed calculation unit 35 calculates the speed of the object on the basis of the target information of the composite target. In this case, the speed of the object is calculated by dividing the distance to the object in the target information of the composite target by the interval of the processing cycle. When only the radar target is generated, the speed calculation unit 35 may calculate the speed of the object on the basis of the target information of the radar target. In this case, the speed of the object is calculated by dividing the distance to the object in the target information of the radar target by the interval of the processing cycle.

When only the image target is generated, the speed calculation unit 35 calculates the speed of the object on the basis of the target information of the image target. In this case, the speed calculation unit 35 calculates the speed of the object, using the vehicle speed indicating the speed of the vehicle and the image speed indicating the speed of the object at a ratio corresponding to the distance to the object.

The collision determination unit 36 determines a collision with the object on the basis of the speed of the object calculated by the speed calculation unit 35. The collision determination unit 36 determines the possibility of a collision with the object on the basis of whether a collision time obtained by dividing the distance to the object by the speed of the object is less than a predetermined threshold value. For example, the determination result of the possibility of the collision is used to notify the driver of information or to control the braking or steering of the vehicle.

Next, the operation of the collision determination device will be described with reference to FIG. 7. FIG. 7 is a flowchart illustrating the operation of the collision determination device. The collision determination device repeatedly performs the process shown in FIG. 7 in a predetermined cycle.

First, the speed sensor 11 detects the speed of the vehicle (vehicle speed) (Step S21). The radar target generation unit 22 generates the radar target when the object is present in the detection range of the radar 13 (S22). The image target generation unit 21 generates the image target when the object is present in the detection range of the stereo camera 12 (S23). The composite target generation unit 23 generates the composite target when the radar target and the image target are collated with each other (S24).

The speed calculation unit 35 determines whether the composite target has been generated, that is, whether the object has been detected by both the sensors 12 and 13 (S25).

When it is determined that the composite target has been generated, the speed calculation unit 35 calculates the speed of the object on the basis of the composite target (S26). That is, the speed calculation unit 35 calculates the speed of the object on the basis of the distance to the object in the target information of the composite target. Then, the collision determination unit 36 divides the distance to the object by the speed of the object to calculate the collision time, on the basis of the target information of the composite target (S27).

On the other hand, when it is determined in S25 that the composite target has not been generated, the ECU 30 generates the composite target and determines whether only the image target has been generated (S28). That is, the ECU 30 determines whether the object is detected only by the stereo camera 12 in the current processing cycle after it is detected by the radar 13 and the stereo camera 12 in the previous processing cycle.

For example, this corresponds to a case in which the pedestrian who crosses in front of the vehicle that is traveling deviates from the detection range of the radar 13 or a case in which the object has not been detected (lost) by the radar 13 for any reason. In this case, as the distance to the object increases, the calculation accuracy of the speed of the object based on image detection information is reduced.

When it is determined in S28 that only the image target has been generated, the image target generation unit 21 calculates the image speed (absolute speed) from the image detection information indicating the speed of the object (S29). The stationary state determination unit 24 determines whether the object is stationary on the basis of the vehicle speed and the image speed (S30). However, the process in S30 may be omitted.

When the process in S30 is performed, the process in S31 and the subsequent steps is performed if it is determined in S30 that the object is stationary, and is not performed and ends if it is determined in S30 that the object is not stationary. When it is not determined in S28 that only the image target has been generated, the process ends.

As described with reference to FIG. 3, the speed calculation unit 35 calculates a distance coefficient corresponding to the distance to the object, using the target information of the image target (S31). The speed calculation unit 35 calculates the speed (relative speed) of the object on the basis of the distance coefficient, the vehicle speed, and the image speed, using the above-mentioned Expression (1) (S32).

When the speed of the object is calculated, the collision determination unit 36 divides the distance to the object by the speed of the object to calculate the collision time, on the basis of the target information of the image target (S33). When the collision time is calculated in S27 or S33, the collision determination unit 36 determines a collision with the object on the basis of the collision time (S34).

As described above, the speed calculating device according to the second embodiment calculates the speed of the object, using the vehicle speed (moving body speed) and the image speed when the radar 13 does not detect the object after the composite target is generated. Therefore, the composite target and the detection result obtained by the image can be appropriately used according to the detection situation of the radar 13 to calculate the speed of the object.

When the object is not detected by the radar 13, but is detected by the stereo camera 12, the speed of the object may be calculated using the vehicle speed (moving body speed) and the image speed. Therefore, the detection result obtained by the radar waves and the detection result obtained by the image may be appropriately used according to the detection situation of the object to calculate the speed of the object.

When the radar 13 does not detect the object after the composite target is generated, the speed of the object is calculated, using the vehicle speed (moving body speed) and the image speed. Therefore, the composite target and the detection result obtained by the image may be appropriately used according to the detection situation of the radar 13 to calculate the speed of the object.

When the object is present outside the detection range of the radar 13 and is present in the detection range of the stereo camera 12, the speed of the object is calculated using the vehicle speed (moving body speed) and the image speed. Therefore, the detection result obtained by the radar waves and the detection result obtained by the image may be appropriately used according to the position of the object to calculate the speed of the object.

When it is determined that the object is stationary, the speed of the object is calculated using the vehicle speed (moving body speed) and the image speed. Therefore, the speed of the object may be accurately calculated using the vehicle speed (moving body speed).

In the second embodiment, the case in which the composite target and the detection result obtained by the image are appropriately used according to the detection situation of the radar 13 to calculate the speed of the object has been described. However, this embodiment is similarly applied to a case in which the detection result obtained by the radar waves and the detection result obtained by the image are appropriately used according to the detection situation of the radar 13 to calculate the speed of the object.

The above-described embodiments are the preferred embodiments of the speed calculating device, the speed calculating method, and the collision determination device according to the invention. However, the speed calculating device, the speed calculating method, and the collision determination device according to the invention are not limited to these embodiments. The speed calculating device, the speed calculating method, and the collision determination device according to the invention may be modified without departing from the scope and spirit of the invention described in the claims or they may be applied to other techniques.

For example, in the above-described embodiments, the functions of the image target generation unit 21 are implemented by the ECU 20 or the functions of the image target generation unit 21 and the radar target generation unit 22 are implemented by the ECU 30. However, the functions of the image target generation unit 21 may be implemented by a single ECU, for example, an ECU for an image sensor and the functions of the radar target generation unit 22 may be implemented by a single ECU, for example, an ECU for a radar sensor.

In the above-described embodiments, the speed of the object is calculated as the relative speed. However, the speed of the object may be calculated as an absolute speed.

The speed calculating device, the speed calculating method, and the collision determination device according to the embodiments of the invention have been described above. In the above-described embodiments, the collision determination device determines a collision with the object on the basis of the speed of the object calculated by the speed calculating device which calculates the speed of the object which is disposed around the vehicle, particularly, in front of the vehicle.

However, as described above, the moving body is not limited to the vehicle and may be, for example, a ship, an airplane, or a flying object. In the above-described embodiments, the speed calculating device calculates the speed of the object in front of the moving body. However, the invention is not limited thereto and the speed calculating device may calculate the speed of the object in the traveling direction of the moving body and the collision determination device may determine a collision with the object on the basis of the speed of the object.

For example, an image sensor (image detection unit) which captures the image of the front side of the moving body and detects an object from the captured image can be used to calculate the speed of the object in front of the moving body. In addition, at least two image sensors which capture the image of an object in front of the moving body and the image of an object on the rear side of the moving body and detect the objects from the captured images can be used to calculate the speed of the object in the traveling direction of the moving body.

REFERENCE SIGNS LIST

11: SPEED SENSOR
12: STEREO CAMERA
13: RADAR
20, 30: ECU
21: IMAGE TARGET GENERATION UNIT
22: RADAR TARGET GENERATION UNIT
23: COMPOSITE TARGET GENERATION UNIT

24: STATIONARY STATE DETERMINATION UNIT
25, 35: SPEED CALCULATION UNIT
26, 36: COLLISION DETERMINATION UNIT

The invention claimed is:

1. A speed calculating device configured to calculate a speed of an object around a moving body, comprising:
an image sensor that captures an image of the surroundings of the moving body and detects the object from the captured image; and
an electronic control unit (ECU) configured to calculate the speed of the object, using a moving body speed, indicating the speed of the moving body, and an image speed, the image speed being calculated using a distance from the moving body to the object in consecutive image processing cycles,
wherein the ECU is configured to calculate the speed of the object using the moving body speed and the image speed such that a weight of the moving body speed increases as the distance to the object increases and a weight of the image speed increases as the distance to the object decreases, and
wherein the ECU is configured to determine a collision with the object on the basis of the calculated speed of the object.

2. The speed calculating device according to claim 1, further comprising:
a radar sensor that detects the object using a radar wave,
wherein, when the object is not detected by the radar sensor, but is detected by the image sensor, the ECU is configured to calculate the speed of the object, using the moving body speed and the image speed.

3. The speed calculating device according to claim 2,
wherein the ECU is configured to generate a composite target of the object using a detection result obtained by the radar sensor and a detection result obtained by the image sensor,
wherein, when the radar sensor does not detect the object after the composite target is generated, the ECU is configured to calculate the speed of the object, using the moving body speed and the image speed.

4. The speed calculating device according to claim 1, further comprising:
a radar sensor that detects the object using a radar wave,
wherein, when the object is present outside a detection range of the radar sensor and is present in a detection range of the image sensor, the ECU is configured to calculate the speed of the object, using the moving body speed and the image speed.

5. The speed calculating device according to claim 1,
wherein the ECU is configured to determine whether the object is stationary in a traveling direction of the moving body,
wherein, when it is determined that the object is stationary, the ECU is configured to calculate the speed of the object using the moving body speed and the image speed.

6. The speed calculating device according to claim 1,
wherein, when the distance to the object is equal to or greater than an upper limit, the ECU is configured to calculate the speed of the object using the moving body speed and the image speed such that the weight of the moving body speed is 1 and the weight of the image speed is 0.

7. The speed calculating device according to claim 1,
wherein, when the distance to the object is equal to or less than a lower limit, the ECU is configured to calculate the speed of the object using the moving body speed and the image speed such that the weight of the moving body speed is 0 and the weight of the image speed is 1.

8. The speed calculating device according to claim 1,
wherein the speed calculating device is configured to calculate a speed of an object in front of the moving body and includes:
the image sensor that captures an image of a front side of the moving body and detects the object from the captured image; and
the ECU that is configured to calculate the speed of the object, using the moving body speed, indicating the speed of the moving body, and the image speed, and
wherein the ECU is configured to calculate the speed of the object using the moving body speed and the image speed such that the weight of the moving body speed increases as the distance to the object increases and the weight of the image speed increases as the distance to the object decreases.

9. The speed calculating device according to claim 1,
wherein the speed calculating device is configured to calculate a speed of an object in a traveling direction of the moving body and includes:
the image sensor that captures an image in the traveling direction of the moving body and detects the object from the captured image; and
the ECU that is configured to calculate the speed of the object, using the moving body speed indicating the speed of the moving body, and the image speed, and
wherein the ECU is configured to calculate the speed of the object using the moving body speed and the image speed such that the weight of the moving body speed increases as the distance to the object increases and the weight of the image speed increases as the distance to the object decreases.

10. The speed calculating device according to claim 1,
wherein the moving body is a vehicle.

11. A collision determination device comprising:
an image sensor that captures an image of the surroundings of a moving body and detects an object from the captured image; and
an electronic control unit (ECU) configured to calculate the speed of the object, using a moving body speed, indicating the speed of the moving body, and an image speed, the image speed being calculated using a distance from the moving body to the object in consecutive image processing cycles,
wherein the ECU is configured to calculate the speed of the object using the moving body speed and the image speed such that a weight of the moving body speed increases as the distance to the object increases and a weight of the image speed increases as the distance to the object decreases,
wherein the ECU is configured to calculate a collision time on the basis of the calculated speed of the object and the distance to the object, and determine a collision with the object on the basis of whether the collision time is less than a predetermined threshold.

12. A speed calculating method configured to calculate a speed of an object around a moving body, comprising:
capturing an image of the surroundings of the moving body and detecting the object from the captured image;
calculating the speed of the object, using a moving body speed, indicating the speed of the moving body, and an image speed, the image speed being calculated using a distance from the moving body to the object in consecutive image processing cycles, such that a weight of the moving body speed increases as the distance to the object increases and a weight of the image speed increases as the distance to the object decreases; and
determining a collision with the object on the basis of the calculated speed of the object.

* * * * *